United States Patent [19]

Fowler et al.

[11] 3,960,348

[45] June 1, 1976

[54] AERODYNAMIC SURFACE CONTROL FEEL AUGMENTATION SYSTEM

[75] Inventors: Donald W. Fowler, West Haven; Sean J. O'Connor, Bristol, both of Conn.

[73] Assignee: United Technologies Corporation, Hartford, Conn.

[22] Filed: Aug. 4, 1975

[21] Appl. No.: 601,815

[52] U.S. Cl. ........................ 244/83 D; 244/17.13; 244/187; 244/78; 244/85; 416/31; 416/43
[51] Int. Cl.² .................................................. B64C 13/46
[58] Field of Search ............ 244/17.11, 17.13, 76 R, 244/77 R, 77 D, 77 E, 77 F, 77 G, 77 M, 77 SE, 78, 83 R, 83 D, 85; 416/31, 43, 61; 91/367, 453

[56] References Cited
UNITED STATES PATENTS

| | | | |
|---|---|---|---|
| 2,051,837 | 8/1936 | Fischel | 244/78 |
| 2,831,643 | 4/1958 | Rasmussen et al. | 91/367 |
| 3,021,097 | 2/1962 | Hecht | 244/78 |
| 3,034,483 | 5/1962 | Rasmussen | 244/78 |
| 3,050,276 | 8/1962 | Wissinger | 244/17.13 |
| 3,220,317 | 11/1965 | Fuell | 244/78 UX |
| 3,463,423 | 8/1969 | Wong et al. | 244/83 D |
| 3,580,139 | 5/1971 | Rasmussen | 244/78 |
| 3,744,928 | 7/1973 | Hansen et al. | 416/43 |
| 3,764,095 | 10/1973 | Schenbeck | 244/77 M |
| 3,862,730 | 1/1975 | Heiney | 244/83 D |

Primary Examiner—Trygve M. Blix
Assistant Examiner—Galen L. Barefoot
Attorney, Agent, or Firm—Dominic J. Chiantera; M. P. Williams

[57] ABSTRACT

In a helicopter, a pilot-actuated lever controls, through linkage mechanisms, a servo valve to drive a hydraulic piston; the piston moves a swash plate which in turn controls movement of rotor blade pitch positioning mechanisms against the force of blade loading, caused by aerodynamic forces. Blade loading, heretofore monitored visually by the pilot on a cruise guide indicator instrument, is used herein to control a secondary input to the servo valve, thereby to alter the position linkage mechanism which causes the force of a spring attached thereto to impose a force on the collective pitch control for blade loadings in excess of one-third of maximum allowable blade loads, in a direction tending to drive the control to lower collective pitch (lower blade loading). This provides "feel" to the pilot in proportion to blade loading when at critical magnitudes. A trim system is selectively actuatable to provide an input to the auxiliary valve which tends to maintain the collective pitch control in a selected position.

3 Claims, 1 Drawing Figure

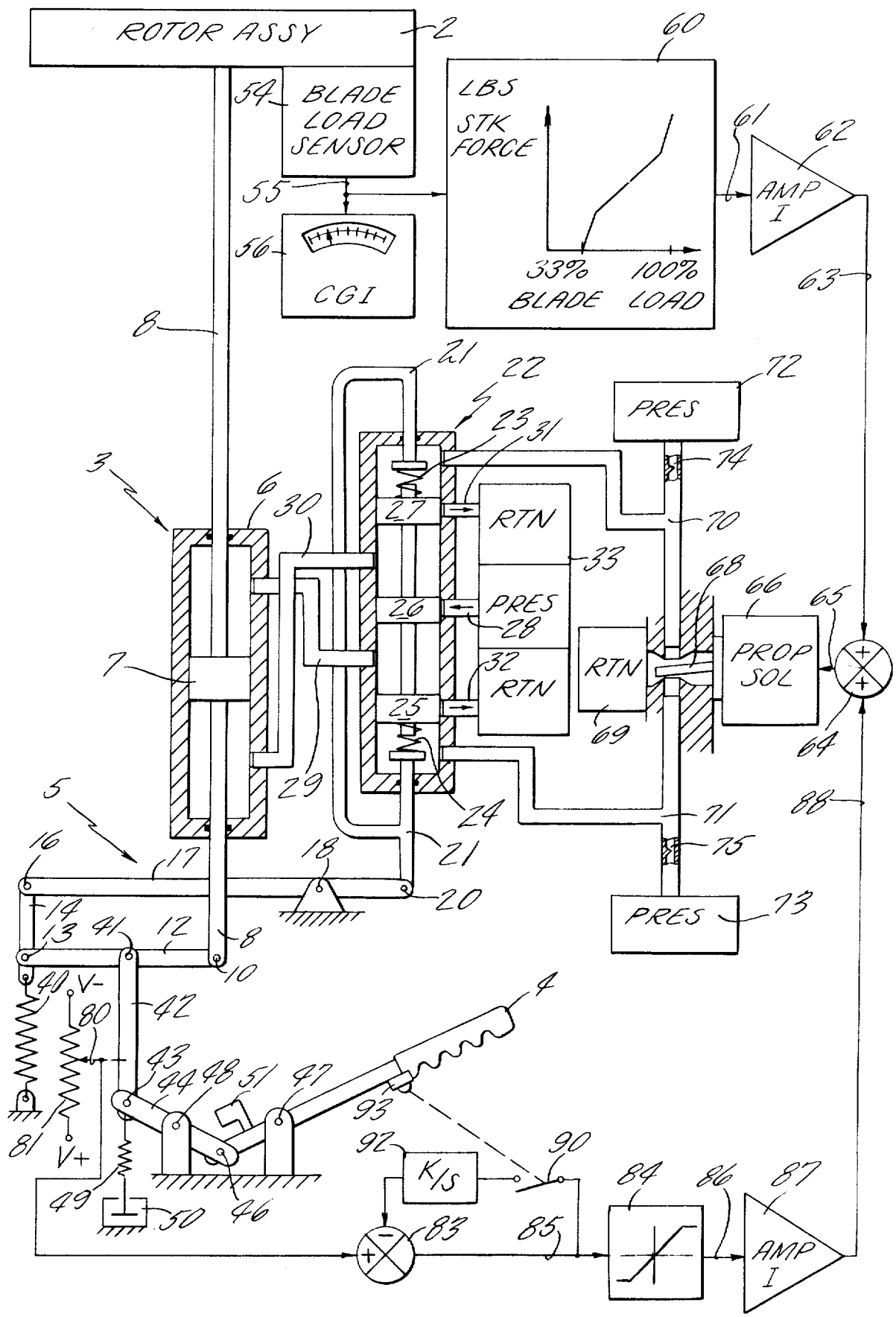

AERODYNAMIC SURFACE CONTROL FEEL AUGMENTATION SYSTEM

BACKGROUND OF THE INVENTION

1. Field of Invention

This invention relates to aerodynamic surface controls, and more particularly to provision of forces for feel augmenting, restoring and positioning the control lever thereof in response to loading thereon.

2. Description of the Prior Art

The positioning of aerodynamic surfaces in response to pilot-actuated controls has taken many forms, from simple cable connections to complex electronically augmented hydromechanical systems. For instance, in helicopters, it is well known to provide an outer control loop in which pilot-manipulated controls provide pitch-adjustments to a main rotor and stabilizing rotor, with an electronic inner control loop responsive to inertial measurement equipment on the helicopter for providing inertial-stability inputs to control the same surfaces in a fashion tending to stabilize the helicopter in flight. This type of system lends itself to the use of hydromechanical actuators for control surface positioning, the pilot-actuated controls being buffered from the effects at the control surfaces by the hydromechanical system. As is commonly known in the case of power steering in an automobile, this takes the "feel" out of control manipulation; therefore, it has been known to provide feel augmentation systems in which forces are purposefully applied back to the pilot-actuated controls in a manner related in some fashion to the surface being controlled thereby, to impart information to the pilot through the feel of the control itself.

In the case of helicopter rotors, the principle means of maneuvering the craft is to control the pitch of the rotor blades collectively (all in the same fashion) to cause the lift to vary, thereby imparting altitude changes, as well as cyclically (as the function of the position of each rotor blade with respect to the aircraft as the rotor rotates) in order to control pitch and roll, thereby to control turns and forward speed. It was soon learned that causing too great a pitch angle of the rotor blades induced vibration in the rotor, which could be heard by the pilot as well as felt in the collective pitch control, since a small fraction of the vibration was transmitted through the collective pitch actuating mechanism to the control lever itself. Thus, by the vibration felt in the lever as well as the sound induced by vibration, the pilot could maintain a collective pitch which was just below that causing vibration to ensure that the rotor blades were not subjected to excessive aerodynamic loading. With improvements, the vibration in the rotor as a result of blade loading has been significantly reduced. This results in a loss of the vibration-indication of rotor blade loading. As a substitute, it is known to measure the force required for the collective pitch actuating mechanism to move the swash plate (which alters the pitch of the blades) by means of an electromechanical transducer, which provides an indication of rotor loading on a cockpit panel instrument, called a cruise guide indicator. However, during maneuvering of the helicopter, visual concentration on the cruise guide indicator interferes with the pilot's ability to make visual observations of the environment, and presents potential safety hazards.

SUMMARY OF THE INVENTION

An object of the present invention is to impart a force to the control lever of an aircraft control surface as a function of the aerodynamic loading of the control surface. Another object of the invention is to impart a force to a control lever of an aircraft control surface which tends to move the lever in a direction reducing the aerodynamic loading of the control surface. A further object of the invention is to provide, in a hydromechanical control surface positioning system, a position trim capability for maintaining selected positions of the control lever.

According to the present invention, an aircraft control surface hydromechanical actuating mechanism includes an input responsive to control surface loading and means responsive to loading in excess of a desired magnitude to impart a force to the control lever of the control surface actuating mechanism in a direction tending to cause motion of the surface in a direction to reduce the loading thereof. According further to the invention, a selectively actuatable trim mechanism responsive to the position of the control lever provides an input to the actuating mechanism which through the linkage thereof tends to maintain the control lever in a selected position.

In still further accord with the present invention, the aerodynamic loading of a control surface positioned by a hydraulic piston in response to fluid pressure provided thereto through a servo valve is used to provide an auxiliary input to the servo valve to cause motion of the piston in a direction to move the control surface in a manner to reduce the loading thereon; such motion, through linkage between the hydraulic piston and the control lever, acting against the force of a spring to induce a force into the control lever to provide feel thereto; the auxiliary servo valve input is also selectively responsive to a trim input to cause servo valve action to null the movement of the linkage at a selected position of the control lever.

The present invention provides a measure of safety in control surface positioning systems, such as the collective pitch control in a helicopter, by imparting forces into the system which tend to reduce excessive loading of the surface. The invention also provides feel to the control lever, which alerts the pilot to loading conditions on the control surface by virtue of the force he must overcome in order to position the control lever, thereby rendering it unnecessary for him to monitor a panel instrument, such as a cruise guide indicator in a helicopter. The invention also provides simple and safe automatic maintenance of control lever position compatible with feel augmentation and load reducing.

The foregoing and other objects, features and advantages of the present invention will become more apparent in the light of the following detailed description of a preferred embodiment thereof, as illustrated in the accompanying drawing.

BRIEF DESCRIPTION OF THE DRAWING

The sole FIGURE herein comprises an illustrative, schematic block diagram of an exemplary embodiment of the invention.

DESCRIPTION OF THE PREFERRED EMBODIMENT

Referring now to the drawing, a control surface position, such as the pitch of the rotor blades 2 in a helicopter, is controlled through a hydraulic mechanism 3 in response to a collective pitch control stick or lever 4 connected thereto by mechanical linkage 5. The hydraulic mechanism 3 includes a cylinder 6, housing a piston 7 which is integrally attached to a rod 8, the upper end of which is connected in a well-known fashion to the swash plate of the rotor assembly 2 so as to change the collective (continuous) pitch of all of the blades of the rotor by a desired amount. The lower end of the rod 8 is connected by a pivot 10 to a lever 12, the other end of which is connected by a pivot 13 to a lever 14, which in turn is connected by a pivot 16 to a lever 17. The lever 17 is pivoted to the frame at a point 18, and has a pivot 20 at its opposite end connected to a carriage or C shaped actuating rod 21 of a servo valve 22. The rod 21, by alternately applying force to either of two centering springs 23, 24 actuates a group of three interconnected valve members 25–27 which control the application of fluid pressure at an inlet port 28 through a selected one of two conduits 29, 30 to the inside of the cylinder 6, and controls passage of return pressure through either of two outlet ports 31, 32 to a source of fluid pressure 33.

The lever 14 is connected to a spring 40, the other end of which is fixed to the aircraft structure. The lever 12 is connected at its midpoint by a pivot 41 to a lever 42, the other end of which is connected by a pivot 43 to a lever 44. The lever 44 is connected by a pivot 46 to the collective pitch lever 4, which is rotated with respect to the aircraft frame by a pivot 47, as is the lever 44 by a pivot 48. The pivot 43 is also connected through an override spring 49 to a damper, such as a dashpot 50, the other side of which is fixed to the aircraft structure. The collective pitch lever 4 may be provided with a counterweight 51.

Ignoring for the moment the spring 40, the raising of the collective pitch lever 4 causes the pivot 46 to lower, raising the pivots 43 and 41. Since the pivot 10 is fixed on the end of the rod 8, it does not move, causing the pivot 13 to move twice as much as does the pivot 41 (due to the location of pivot 41 at the midpoint of lever 12). This imparts the same motion to the pivot 16, which through the pivot 18 causes a fraction of that motion to occur as a downward displacement of the pivot 20 and the rod 21. As a result, the spring 23 compresses imparting a downward force to the valve members 25–27 which are lowered, causing fluid pressure to pass from the inlet 28 above the valve member 26, through the conduit 30 to the lower portion of the cylinder 6, thereby driving the piston 7 and rod 8 upwardly (which is the same direction as the motion of the lever 42). Assuming that the selected position of the lever 4 remains fixed, the member 42 and pivot 41 will still be in the selected position, so that the upward motion of the pivot 10, in response to motion of the rod 8, causes the lowering of the pivot 13, and therefore of the pivot 16, which causes the pivot 20 to raise the rod 21 to its original position, thereby eliminating the compression of spring 23 and allowing both springs 23, 24 to return to equilibrium, thereby returning the valve members to the closed position (as shown). Thus, movement of the control lever 4 to any selected position causes the rod 8 to assume a commensurate new position, the servo valve 22 opening only long enough to cause the motion, and then closing again.

A blade load sensor 54 of a type known in the art, which may, for instance, sense the change in length of a spring connected between the swash plate and the rotor blades, which increases in proportion to the amount of collective pitch, and provide an electrical signal, such as a voltage signal, on a line 55 which is proportional to blade loading, and which may be presented to a cruise guide indicator 56 in a fashion known to the art. In the past, the pilot would observe the cruise guide indicator 56 to determine the loading on the rotor blades and govern his positioning of the collective pitch lever 4 accordingly.

The foregoing description is applicable to known collective pitch actuating mechanisms known to the art. In accordance with the invention, the voltage signal on the line 55 is applied to a function generator amplifier 60 which provides a voltage signal on an output line 61 that is a function of the input signal on the line 55, as indicated in the drawing. More specifically, the output signal on the line 61 is zero until the input signal indicates blade loading which is on the order of one-third of the maximum permissible operational blade loading, at which time the signal on the line 61 increases, first at a rather high gain, then at a lower gain, and then at another high gain. This may be accomplished in a well-known fashion by means of a voltage amplifier having a plurality of diode feedback paths with differing gains so as to achieve the function as shown. The voltage signal on the line 61 is passed through a current amplifier 62, which provides a current on a line 63 to a summing junction 64, the output of which is fed by a line 65 to a proportional solenoid 66 of any well-known type. The proportional solenoid is responsive to currents of either polarity so as to drive a vane 68 upwardly or downwardly (as seen in the FIGURE) in dependence upon the polarity of the signal on the line 65, by an amount dependent upon the magnitude of the current signal on the line 65. The vane 68 controls the amount of pressure bleed (to a return line 69) through respective conduits 70, 71 from pressure sources 72, 73, having pressure drop restrictors 74, 75 in the path thereof. As the bleed increases, as is shown for the conduit 70 in the drawing, the increased flow through the restrictor 74 causes a reduction of pressure in the conduit 70; this is accompanied by a decrease in the bleed in the conduit 71 so that there is less of a pressure drop caused by the restrictor 75. The difference in pressure in the conduits 70, 71 provides a fluid pressure differential across the servo valve members 25–27 causing the valve to raise upwardly and compress the spring 23 (with the vane 68 in the position shown in the drawing), which further causes fluid pressure to pass from the inlet 28 to the conduit 29, to the upper portion of the cylinder 6, driving the piston 7 and the rod 8 downwardly to reduce the blade loading. As the blade loading decreases below the threshold level of the function generator amplifier 60 (approximately one-third of maximum) the current signal on the line 63 reduces to zero causing the vane 68 to recenter and equalize the pressure bleed on conduits 70, 71. This results in a zero pressure differential across the servo members 25–27, decompressing spring 23 and allowing the members 25–27 to be restored to the equilibrium position stopping any further fluid pressure flow through the conduit 29, and stopping the downward travel of the piston 7. Thus, an increase in blade loading manifested by a current on the line 63 causes the servo valve to drive the piston downwardly, thereby reducing collective pitch and also reducing the loading on the rotor blades.

Under the conditions of blade loading, described hereinbefore, the downward travel of the piston 7 and rod 8 causes pivot 10 to be lowered by a corresponding amount. The lever 12, acting about the pivot 13 and the tension applied thereto by the spring 40, provides a downward acting force on the pivot 41 which is proportional to the spring constant of the spring 40. If the selected amount of collective pitch is to be maintained in the presence of blade loading, the pilot must provide an upward force on the collective pitch lever 4 to equalize the downward acting force at the pivot 41. The amount of downward force on pivot 41, and the required amount of upward force on the lever 4 provided by the pilot to maintain collective pitch lever position, increasing as the amount of blade loading increases and providing the pilot with a direct measure or quantification of the degree of blade loading. When the pilot provides the required amount of upward holding force on the control lever 4, steady state operation is achieved because the current on the line 63, which causes movement of the vane 68 and therefore fluid pressure differential between the conduit 70, 71 is attempting to move the valve members 25-27 upwardly, but at the same time, the upward force on the collective pitch lever 4 has extended the spring 40 and through the linkage mechanisms is applying a downward force on the pivot 20 trying to move the members 25-27 downwardly, causing the valve members 25-27 to remain in equilibrium so that the piston 7 does not move.

An additional aspect of the present invention is the provision of trim control, which is a selectively actuated means for maintaining the selected position of the control lever 4 automatically. This is provided by sensing the position of the control lever 4 (through the associated linkage mechanism) and feeding a signal related thereto to the summing junction 64. Specifically, the wiper 80 of a potentiometer 81 connected between suitable voltages of opposite polarity is applied to a positive input of a summing injection 83, the output of which is fed to a gain shaper 84, which provides a gain shaped response to limit the authority of the signal on the wiper, in a manner well known in the art, over a line 85. The output of the gain shaper 84 is presented through a line 86 to a current amplifier 87, which provide a current proportional to the wiper signal on a line 88 to an input of the summing junction 64. The signal on the line 85 is also connected through a normally open switch 90 to the input of a high gain (low time constant) integrator 92, the output of which is connected to a negative input of the summing junction 83. The switch 90 is controlled by a button 93 mounted on the collective pitch lever 4, such that squeezing the button 93 moves the switch contact upwardly (as seen in the drawing) to the closed position, connecting the integrator 92 to the input of the gain shaper 84. With the switch 90 closed, the integrator tracks the voltage on the line 85 until the output voltage signal of the integrator equals the voltage on the wiper 80, causing the signal on the line 85 to be reduced to zero. This allows free movement of the control lever 4 to a new position, after which the button 93 can be released, thereby opening the switch 90 and preventing further integration of the integrator 92. The output signal of the integrator is equal to the voltage of the wiper 80 corresponding to the new position of the lever 4, and the currents on the line 88 are zero. Any tendency of the lever 4 to move to a different position without depressing the button 93, creates a voltage signal on the line 85 and a corresponding current signal on the line 88 which causes actuation of the servo valve to move the mechanical linkage mechanism 5 so as to reposition the lever 4 to the prior selected position, in a closed loop manner well known to the art. The effect of the current signal on the line 88 to the hydromechanical system is similar to the effect described hereinbefore with respect to the current on the line 63. The proportionate magnitudes of the current signals on the lines 63, 88 can be chosen by suitable choice of the relative gains of the amplifiers 62, 87 so as to provide the degree of control desired in the two portions of the system.

The dashpot 50 dampens out vibratory tendencies in the mechanical linkage 5 and control lever 4 resulting from the closed loop servo operation of the system described hereinbefore. Such a dampening function further augments control lever 4 forces by providing a "smoothing out" of the forces created during control lever repositioning, in addition to providing a velocity limiting safety feature during rapid changes in the force applied to the control lever, or during electric system failure. The override spring 49 provides an override of the dashpot 50, permitting rapid inputs of collective pitch by the pilot when necessary.

Although not shown in the drawing, the present invention may be incorporated with other accoutrements known in the art. For instance, instead of a single collective pitch control lever, two levers may be provided so as to facilitate control of collective pitch at a gunner's or other operators position. Similarly, although the invention has been shown and described with respect to preferred embodiments thereof, it should be understood by those skilled in the art that the foregoing and various other changes, omissions and additions may be employed without departing from the spirit and the scope of the invention.

Having thus described a typical embodiment of our invention, that which we claim as new and desire to secure by Letters Patent is:

1. A system for positioning a control surface of an aircraft comprising:

means for sensing the aerodynamic loading of at least one control surface and providing a load signal in response thereto;

a hydraulic actuator, including a piston for positioning the control surface, and having a servo valve for positioning said piston in response to fluid pressure;

a control lever;

mechanical linkage interconnected between said control lever, said servo valve and said piston in a fashion such that the motion of said control lever to a given position causes said mechanical linkage to actuate said servo valve which drives said piston to reposition the control surface, and to return said mechanical linkage to a null position to deactivate said servo;

auxiliary valve means responsive to said load signal for actuating said servo valve independently of said mechanical linkage; and means connected to said mechanical linkage to induce a force into said mechanical linkage in response to motion of said piston actuated by said auxiliary valve, said force being imparted to said control lever in such a manner as to move said control lever in a direction to reduce the aerodynamic loading of the control surface and thereby to reduce the magnitude of said load signal.

2. A system according to claim 1 wherein said auxiliary valve means actuates said servo valve in response to said load signal in such a manner as to drive said piston in a direction to reduce the aerodynamic loading of the control surface.

3. A system according to claim 2 further comprising: means responsive to said control lever for providing a continuous signal indication of the position thereof, said means being selectably actuated to also provide a reference signal indication in response to a selected position of said control lever;

means for comparing the continuous signal indication of said control lever position to the reference signal indication to provide a trim error signal in proportion to the difference therebetween; and summing means responsive to said trim error signal and said load signal for providing the sum thereof to said auxiliary valve means.

* * * * *